US007678178B2

(12) United States Patent
Boddu et al.

(10) Patent No.: US 7,678,178 B2
(45) Date of Patent: Mar. 16, 2010

(54) METHOD AND SYSTEM FOR TREATING METAL-CONTAINING FLUID EMISSIONS

(75) Inventors: Veera M. Boddu, Champaign, IL (US); Kent James Hay, Mahomet, IL (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 321 days.

(21) Appl. No.: 11/802,432

(22) Filed: May 23, 2007

(65) Prior Publication Data
US 2008/0289492 A1 Nov. 27, 2008

(51) Int. Cl.
*B01D 53/04* (2006.01)
*B01J 20/10* (2006.01)

(52) U.S. Cl. .................. 95/133; 95/135; 95/138; 95/151; 55/385.5; 55/525; 502/408

(58) Field of Classification Search .......... 96/108, 96/112, 113, 121, 134, 135, 138, 151, 153; 95/1, 14, 15, 19, 133, 134; 55/385.5, 467, 55/525; 502/407, 408; 86/49
See application file for complete search history.

(56) References Cited

U.S. PATENT DOCUMENTS

| | | | | |
|---|---|---|---|---|
| 3,956,458 A | * | 5/1976 | Anderson | ............... 423/210 |
| 4,163,650 A | * | 8/1979 | Watson et al. | ................ 96/57 |
| 5,346,674 A | | 9/1994 | Weinwurm et al. | |
| 5,505,766 A | * | 4/1996 | Chang | ................ 95/134 |
| 5,619,937 A | | 4/1997 | Linak et al. | |
| 5,670,122 A | | 9/1997 | Zamansky et al. | |
| 5,888,926 A | | 3/1999 | Biswas et al. | |
| 5,925,156 A | * | 7/1999 | Motoki et al. | ................ 55/487 |
| 6,103,205 A | | 8/2000 | Wojtowicz et al. | |
| 6,248,217 B1 | | 6/2001 | Biswas et al. | |
| 6,322,613 B1 | * | 11/2001 | Wojtowicz et al. | ............ 95/107 |
| 6,395,070 B1 | | 5/2002 | Bhadha et al. | |
| 6,451,091 B1 | * | 9/2002 | Avina | ................ 95/107 |
| 6,790,420 B2 | | 9/2004 | Breen et al. | |
| 6,808,692 B2 | | 10/2004 | Oehr | |
| 6,953,494 B2 | * | 10/2005 | Nelson, Jr. | ................ 95/134 |
| 7,033,419 B1 | | 4/2006 | Granite et al. | |
| 7,204,182 B2 | | 4/2007 | Bouldin et al. | |

(Continued)

OTHER PUBLICATIONS

Boddu, V. et al., Metal Emissions Control from Army Small Arms Deactivation Furnaces, IT3 '05 Conference, 10 pp., May 2005, Texas.

*Primary Examiner*—Frank M Lawrence
(74) *Attorney, Agent, or Firm*—Earl H. Baugher, Jr.

(57) ABSTRACT

A system and associated method for removing metal, including metal in vapor form, from high temperature fluid emissions such as may occur at the exhaust of furnaces or thermal treatment equipment. One embodiment is the Integrated Metal Emissions Control System (IMECS™) incorporating both a Steel Screen Particulate (SSP) Filter System and a Perlite Based Sorbent (PBS) System. IMECS™ uses the SSP Filter System, with pore sizes down to one micron, to capture toxic metal particulate materials and the PBS System to capture vapor phase metals using surface-modified perlite. Using the IMECS™, EPA-listed heavy metals have been removed from representative high-temperature emissions in field tests to easily meet the NESHAP standards.

24 Claims, 10 Drawing Sheets

U.S. PATENT DOCUMENTS

| | | | |
|---|---|---|---|
| 7,494,632 B1 * | 2/2009 | Klunder | 423/210 |
| 7,524,472 B1 * | 4/2009 | Kong | 423/210 |
| 2005/0115407 A1 * | 6/2005 | Boddu et al. | 95/133 |
| 2006/0011115 A1 | 1/2006 | Breen et al. | |
| 2006/0029532 A1 | 2/2006 | Breen et al. | |
| 2006/0067862 A1 | 3/2006 | Herbst | |

* cited by examiner

METHOD AND SYSTEM FOR TREATING METAL-CONTAINING FLUID EMISSIONS

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees. Please contact Bea Shahin at 217 373-7234.

BACKGROUND

DoD operates numerous stationary and mobile conventional demilitarization furnaces at various facilities. Air pollution regulations are becoming more stringent and require installations with these furnaces to control hazardous air pollutants (HAPs). The National Emission Standard for Hazardous Air Pollutants (NESHAP) for hazardous waste combustors for incinerators includes reduction of particulate material emissions from 0.013 grams per dry standard cubic foot (g/dscf) to 0.0015 g/dscf. Allowed lead and cadmium emissions have been reduced from 230 micrograms per dry standard cubic meter ($\mu$g/dscm) to 10 $\mu$g/dscm. Similarly, the arsenic, beryllium and chromium standard has been reduced from 92 $\mu$g/dscm to 23 $\mu$g/dscm.

Preliminary analysis of emissions from the U.S. Army's demilitarization furnaces, such as mobile Ammunition Peculiar Equipment (APE) 1408 Brass Certification Unit and stationary munitions deactivation furnace APE 1236, indicates the presence of lead, cadmium and other metals. The U.S. Army operates a number of these brass certification units at various locations. The development of air pollution control technology allows for the continued use of these units within regulatory constraints, significantly reducing release of HAPs.

The primary difficulty with controlling HAPs from deactivation furnaces derives from typical flow rates (e.g., greater than 500 cfm) of toxic metal vapors and particulates in emissions at temperatures reaching 550° C. Emissions at high flow rates require expensive pollution control systems. Speciation studies conducted by the Army Corps of Engineers, Engineer Research and Development Center (ERDC), Construction Engineering Research Laboratory (CERL), on emissions from deactivation furnaces, found that lead, cadmium, antimony and other metals are released in two phases: solid particulates and vapors. Nearly 97% of the metals are in particulate form. Thus, if the solids are captured in an initial treatment stage, solid phase metal emissions are significantly reduced. However, it is also necessary to capture vapor phase metal compounds to meet NESHAP standards.

A literature search revealed a few works dealing with the removal of lead vapor from a gas stream. Yang et al. reported a method of reducing volatile lead emissions from waste incineration by high temperature capture of vapor phase metals before they condense into fine particles. Packed bed sorption experiments with calcined kaolin at 973-1173° C. were conducted. Lead reacted with the sorbent to form water insoluble lead-mineral complexes. Increased bed temperature resulted in increased capture rates, but it had no effect on maximum uptake. Diffusional resistance developing in the interior of the porous kaolin particles became limiting only after the conversion of lead-kaolin reached a value greater than 50%. (Yang, Hee-Chul et al., *Mechanism and Kinetics of Cadmium and Lead Capture by Calcined Kaoline at High Temperatures, Korean J. Chem. Eng.*, 18(4), 499-505, 2001).

Wronkowski reported adsorption of tetraethyl lead on two kinds of activated carbons at 18° C. with partial pressure from 0.03-0.9 atmosphere. The amount adsorbed depended on the specific surface of the given carbon and on the structure of its pores. (Wronkowski, Czeslaw, *Adsorption of Tetraethyl Lead Vapors on Activated Carbon, Gaz. Woda Tech. Sanit.*, 39(4), 131-132, 1965).

Uberoi and Shadman evaluated several sorbents for removal of lead compounds, mainly $PbCl_2$. The sorbents were silica, alpha-alumina, and any of the natural compounds including kaolinite, bauxite, emathlite, and lime. All experiments were conducted at 700° C. At this temperature $PbCl_2$ chemically reacted with the sorbent producing both water soluble and insoluble compounds. The authors provided relative sorption capacity, with kaolinite giving the best result. (Uberoi, M. and Shadman, M., *High-Temperature Adsorption of Lead Compounds on Solid Sorbents, AIChE Journal*, Vol. 36 at 307-309, 1990).

Wey and his coworkers studied the adsorption mechanisms of heavy metals, including lead, on silica sands using a fluidized bed system operated from 600-800° C. At this temperature range chemical reactions, rather than a physical adsorption, are preferred. They noted that for lead, both chemical and physical adsorption mechanisms are important and depend on the reacting environment. Saturation adsorption capacities of silica sand for lead were 16.08 mg/g at 600° C. and 12 mg/g at 800° C. (Chen, Scott et al., *An Evaluation of Carbon-Based Processes for Combined $Hg/SO_2/NOx$ Removal from Coal Combustion Flue Gases, Book of Abstracts 216th ACS National Meeting*, Boston, Aug. 23-27, 1998. Chen, J-C. et al., *Adsorption Mechanism of Heavy Metals on Sorbents During Incineration*, J. of Environmental Engineering, Vol. 127, No. 1, pp. 63-69, 2001).

DETAILED DESCRIPTION

Figure 1:
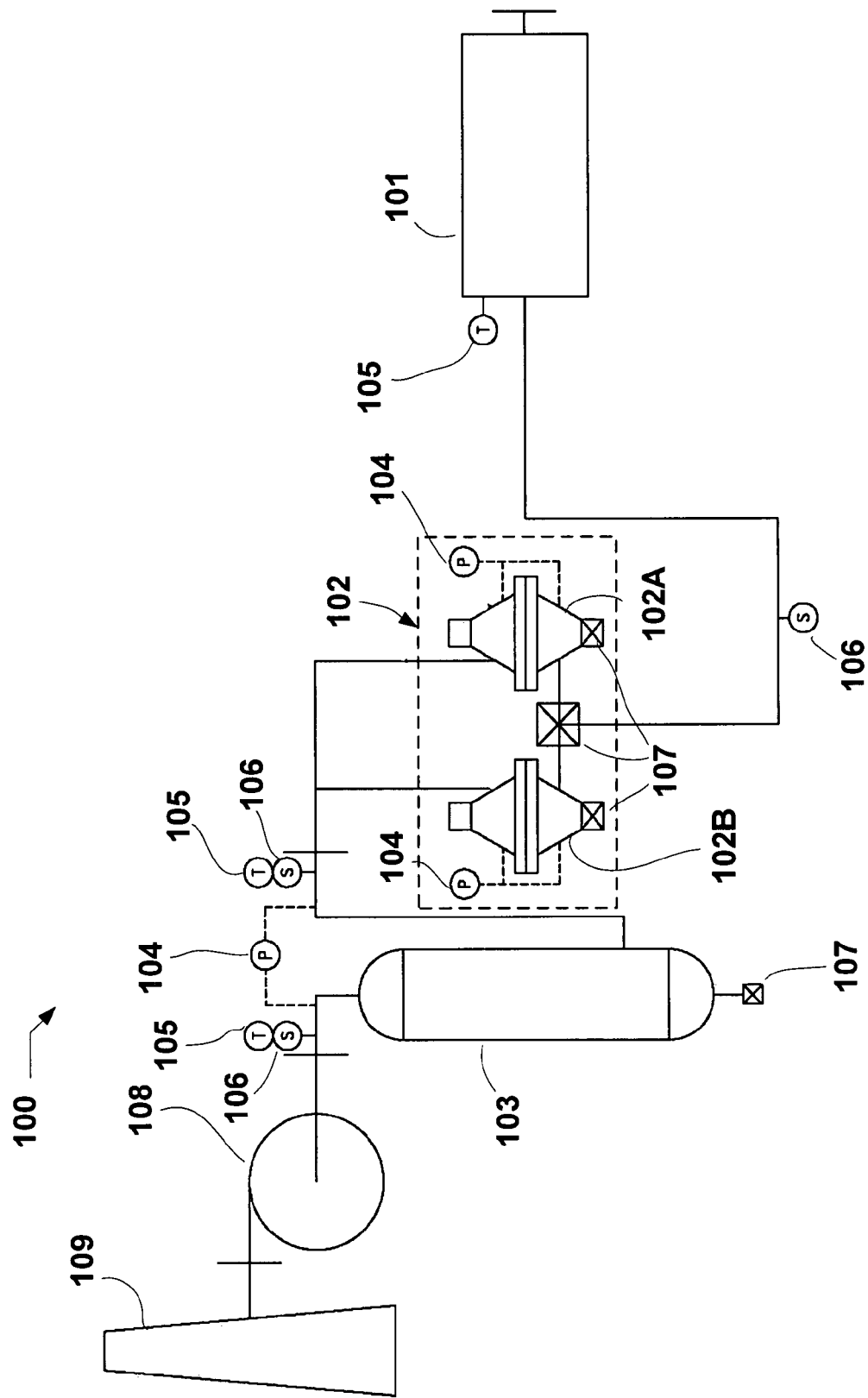
FIG. 1 is a schematic for a select embodiment of the present invention.

Select embodiments of the present invention envision a system for treating metal-containing fluid emissions from a source that comprises one or more first devices to capture and retain solid metal in fluid emissions, the first devices connected to the source; one or more second devices to capture and retain metal in vapor form, the second devices downstream from the first devices with respect to the source and connected to the first devices; and one or more fans connected to the second devices for facilitating movement of the fluid emissions through the system.

In select embodiments of the present invention, the system further comprises one or more stacks connected to the fans for exhausting the fluid emissions from the system.

In select embodiments of the present invention, the system further comprises connectors for connecting the source to the first devices, the first devices to the second devices, the second devices to the fans, and the fans to the stacks.

In select embodiments of the present invention, the connectors are conduits capable of withstanding temperatures up to approximately 1300° F. (705° C.).

In select embodiments of the present invention, the system incorporates pressure gauges for monitoring pressure drop across each of the first and second devices.

In select embodiments of the present invention, the system incorporates temperature gauges to monitor temperatures at the output of the source and the output of each first and second devices.

In select embodiments of the present invention, each first and second device incorporates ports for monitoring the content of the fluid emissions.

In select embodiments of the present invention, ports that facilitate removal of excess solids are incorporated in each of the first and second devices.

In select embodiments of the present invention, the system incorporates valves permitting switching between multiple first devices operating in parallel, thus permitting one or more first devices to be removed from operation for inspection and cleaning while the system is operating.

In select embodiments of the present invention, the system incorporates valves permitting switching between multiple second devices operating in parallel such that use of the valves allows one or more second devices to be removed from operation for inspection and cleaning while the system is operating.

In select embodiments of the present invention, each first device comprises one or more metal screens contained within an enclosed structure having an inlet and one or more outlets accessible during system operation, the enclosed structure built to withstand a pre-specified pressure and temperature.

In select embodiments of the present invention, the enclosed structure and the metal screen of the first device at least partially comprise stainless steel, the metal screen having a pore size in the range between of about 1-20 microns for filtering solids from fluid emissions having a temperature at or above about 650° F. (430° C.).

In select embodiments of the present invention the enclosed structure of the first device is configured to be opened by a user of the system for installation and removal of the metal screens, the metal screens having a pore size of about one to about ten microns for filtering solids from fluid emissions at a temperature of about 900-1300° F. (490-705° C.), and the enclosed structure is able to withstand pressure of about 100 psi and temperatures of at least 1300° F. (705° C.).

In select embodiments of the present invention, the second device incorporates perlite positioned on at least one support contained within an enclosed structure having an inlet and one or more outlets and the enclosed second structure is built to withstand flows of a pre-specified pressure and temperature.

In select embodiments of the present invention, the perlite comprises at least in part surface-modified perlite, preferably acid treated.

In select embodiments of the present invention, the enclosed structure of the second device is configured to be opened by a user of the system for installation and removal of the support and perlite; the structure at least partially comprised of stainless steel and the support comprising in part one or more screens of about 20-100 mesh, preferably about 60 mesh; the perlite for filtering metal vapors from fluid emissions having a temperature in the range of about 900° F. (490° C.) to about 1300° F. (705° C.), and the enclosed structure for the second device built to handle pressures of about 100 psi and temperatures of at least 1300° F. (705° C.).

In select embodiments of the present invention, a method for treating metal-containing fluid emissions from a source, comprises: providing one or more first devices incorporated in a system, the first devices connected with the source and used for capturing and retaining solid metal in the fluid emissions; providing one or more second devices incorporated in the system for capturing and retaining metal in vapor form, the second devices downstream from the first device with respect to the source and connected to the first devices; and providing one or more fans incorporated in the system, the fans connected to the second devices for facilitating movement of the fluid emissions through the system.

In select embodiments of the present invention, the method provides one or more stacks incorporated in the system and connected to the fans for exhausting the fluid emissions from the system.

In select embodiments of the present invention, the method further provides connectors from the source to the first devices, from the first devices to the second devices, from the second devices to the fans and from the fans to the stacks.

In select embodiments of the present invention, a method is provided for treating metal-containing fluid emissions from a source, comprising: capturing and retaining solid metal in the fluid emissions in one or more first devices incorporated in a system, the first devices connected to the source; capturing and retaining metal in vapor form in one or more second devices incorporated in the system downstream from the first devices with respect to the source, the second devices connected to the first devices; and facilitating movement of the fluid emissions from the source through the system via one or more fans connected to the second devices.

In select embodiments of the present invention, a system for treating metal-containing fluid emissions from a source, comprises: one or more means for capturing and retaining solid metal in the fluid emissions connected to the source; one or more means for capturing and retaining metal in vapor form in the fluid emissions downstream from the means for capturing and retaining solid metal with respect to the source and connected to the means for capturing and retaining solid metal; and one or more means for facilitating movement of the fluid emissions through the system connected to said means for capturing and retaining metal in vapor form.

In select embodiments of the present invention, the system for treating metal-containing fluid emissions further incorporates one or more means for exhausting the fluid emissions from the system connected to the means for facilitating movement of the fluid emissions.

In select embodiments of the present invention, the Integrated Metal Emissions Control System (IMECS™) incorporates both a Steel Screen Particulate (SSP) Filter System, and a Perlite Based Sorbent (PBS) System. IMECS™ uses the SSP Filter System to capture toxic metal particulate materials and the PBS System to capture vapor phase metals.

Refer to FIG. 1, a conceptual schematic of the IMECS™. In select embodiments of the present invention, the SSP Filter System efficiently captures metal and metal compound particulates at high temperatures using stainless steel screen filters. In select embodiments of the present invention, the SSP Filter System may be used as a pretreatment system before a secondary emission control unit on stationary deactivation furnaces such as the APE 1236 conventional munitions deactivation furnace. In select embodiments of the present invention, the base component of the SSP Filter System is a custom fabricated multi-layer diffusion bonded screen with micron-sized pore structures of stainless steel and high-temperature alloy steels. For example, in select embodiments of the present invention, DYNAPORE® 5-layer sintered wire mesh laminates (supplied by Martin Kurtz, & Co., Inc.) may be employed. These 1-10 µm sintered 316L stainless steel mesh laminates are diffusion (pressure) bonded using a unique sintering process developed by Martin Kurtz & Co., Inc. The sintered 316L stainless steel laminates are cut precisely to required size and passivated.

In select embodiments of the present invention, these screens may withstand operation at temperatures up to about 1000° C. (1830° F.). In select embodiments of the present invention, filters are installed within a metal housing capable of withstanding high temperatures. The air flow from a furnace exhaust passes through the filters horizontally. Select embodiments of the present invention may be used with one or more filter housings as necessary to facilitate continuous operation. In select embodiments of the present invention, the filters are easy to maintain with various cleaning methods such as pulsejet, sonication, or back flush, and the like, and may be operated continuously if alternate operation cycles are split among multiple filter housings. If the pressure drop across the filter rises regardless of in situ cleaning, in select embodiments of the present invention the filters may be removed for wet cleaning in an aqueous bath and reinstalled, e.g., using a snap-on clamping mechanism. In select embodiments of the present invention, an alternative wet cleaning method is an ultrasonic bath with an aqueous cleaner fortified with surfactant. Select embodiments of the present invention may be scaled conveniently and integrated with mobile as well as stationary incinerator systems.

Figure 2:
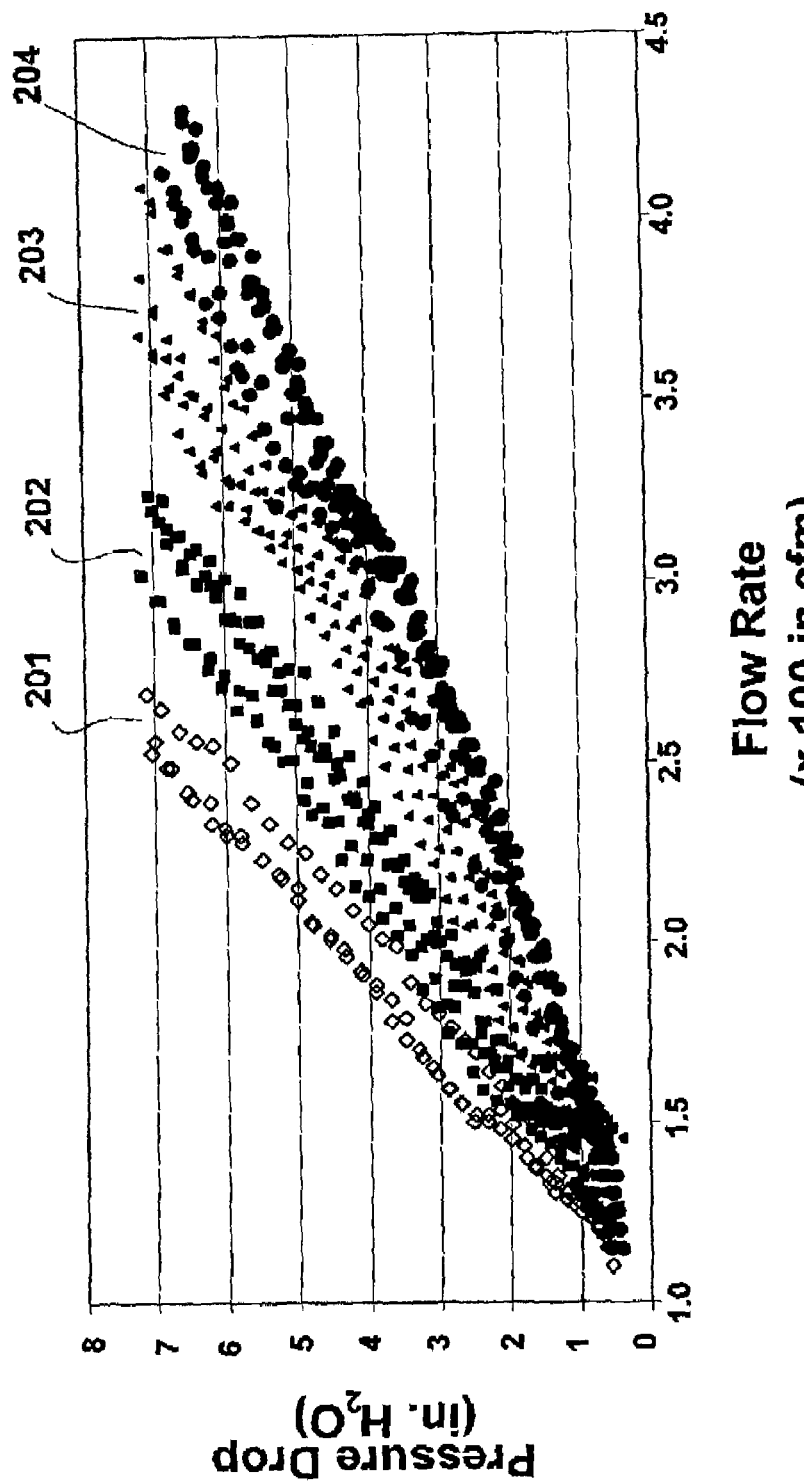
FIG. 2 depicts the pressure drop across various steel filters that may be used in select embodiments of the present invention.

During investigation leading to development of select embodiments of the present invention, stainless steel filters of various mesh sizes were characterized for pressure drop and particle penetration efficiency. Results of pressure drop across different pore size (1 µm, 2 µm, 5 µm, and 10 µm) steel filters are shown in FIG. 2. The data were collected in a laboratory test setup using ambient air. (Boddu et al., *Metal Emissions Control from Army Small Arms Deactivation Furnaces*, IT3 '05 Conference, Texas, May, 2005).

Figures 3, 4:
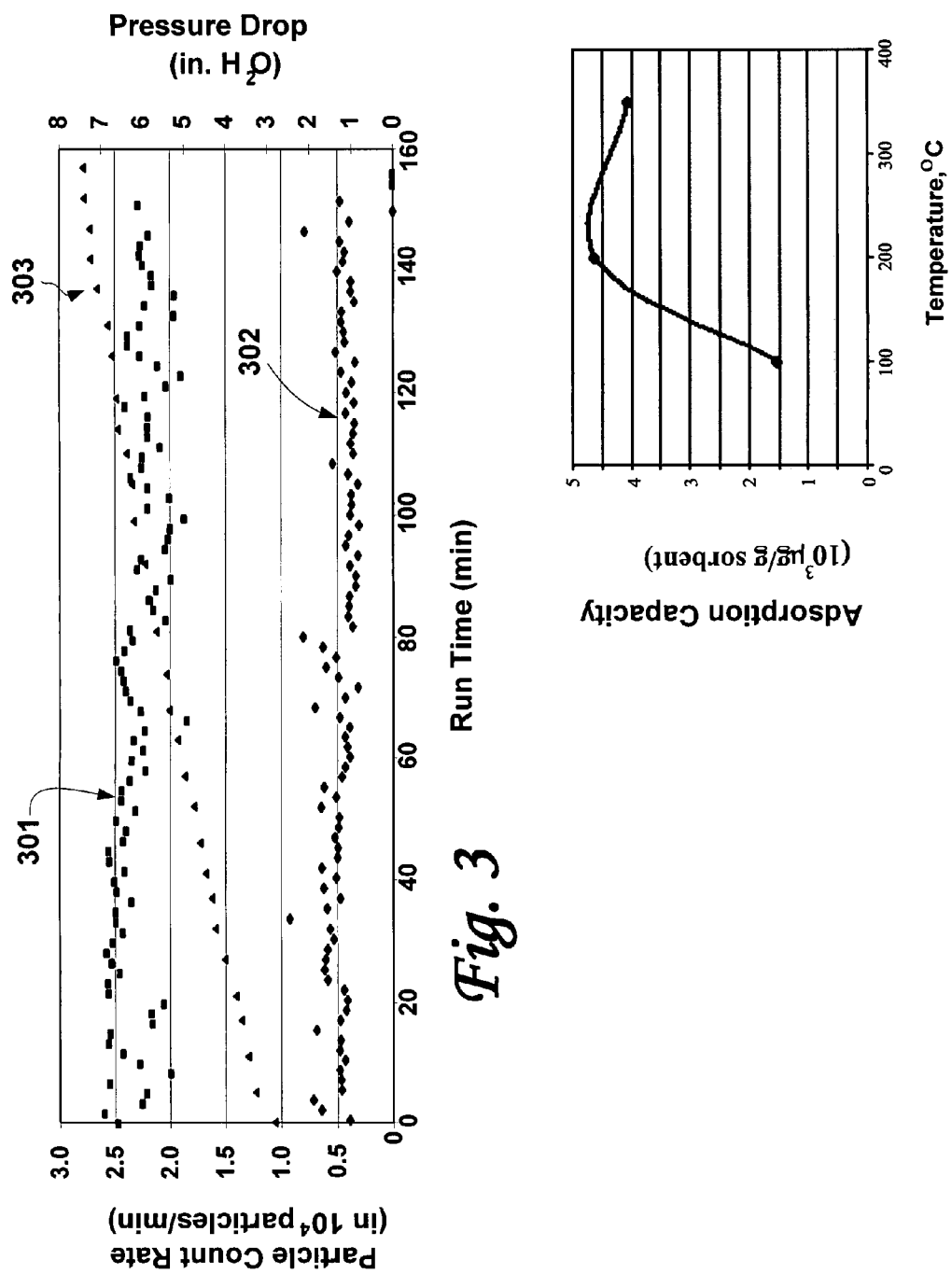
FIG. 3 shows a typical particle penetration results and also pressure drop for a stainless steel filter that may be used in select embodiments of the present invention.
FIG. 4 shows the amount of lead sorbing on modified perlite as a function of operating temperature for a modified perlite that may be used in select embodiments of the present invention.

FIG. 3 shows typical particle penetration results and also pressure drop for a 1 µm steel filter at 150 CFM. ASHRAE Standard 52.1 test dust was used (ASHRAE, *Method of Testing General Ventilation Air-Cleaning Devices for Removal Efficiency by Particle Size, ASHRAE Systems and Equipment Handbook (SI)*, ASHRAE, 2000). The volumetric flux is 0.349 m$^3$/m$^2$-s (1.15 ft$^3$/ft$^2$-s) for 0.3-0.5 µm particles. The filtration experiments were conducted for durations of up to 2.5 hours at room temperature. Particle filtration efficiency and dust holding capacity from the laboratory tests with all the filters are summarized in Table 1.

TABLE 1

Summary of filter efficiency and dust holding capacity for various stainless steel filters.

| Filter Pore Size (µm) | Flow Rate/ Volumetric Flux (SCFM)/ (m$^3$/m$^2$-s) | Filter Efficiency (%) for µm-size Particles | | | | Overall: 0.2-2.0 | Dust-Holding Capacity (g/m$^2$) |
|---|---|---|---|---|---|---|---|
| | | 0.2-0.3 | 0.3-0.5 | 0.5-1.0 | 1.0-2.0 | | |
| 1 | 150/0.349 | 28.67 | 51.73 | 55.55 | 35.46 | 38..8 | 417 |
| 2 | 150/0.349 | 40.88 | 55.30 | 56.76 | 38.97 | 46.5 | 422 |
| 5 | 150/0.349 | 61.37 | 72.54 | 71.19 | 58.06 | 66.4 | 517 |
| 10 | 250/0.582 | 62.33 | 79.23 | 84.28 | 83.28 | 62.3 | 298 |

Table 1 includes the filtration efficiencies for four different µm-sized dust particle ranges for each of four stainless steel filters. As may be expected, the volumetric flow rate for the 10 µm filter was higher than for the other three. All the filtration efficiencies shown are based on particulate counts. The overall efficiency is calculated based on the total number of particles observed upstream as compared to downstream of the filter.

The PBS System, as used in select embodiments of the present invention, may comprise a dry high temperature metal container, such as a stainless steel barrel, filled with surface modified perlite as the sorbent material. In select embodiments of the present invention, the sorbent material is chosen to sorb lead, cadmium and other metals in vapor phase. Perlite is a very porous volcanic aluminosilicate material. The sorbent described here is an adaptation of the technology developed by ERDC-CERL and described in U.S. Pat. No. 7,524,794 B2, Perlite Sorbents for Vapor Phase Metals and Metal Compounds, to Boddu et al., issued Apr. 28, 2009 and incorporated herein by reference. This sorbent is stable at high temperatures and has significant capacity for metal compounds, including those of lead and other heavy metals. Lead sorbing on sulfuric acid-modified perlites as a function of operating temperature is shown in FIG. 4. The sorbent performs well at temperatures above about 150° C (about 300° F). This temperature is easily maintained at the exhaust stack of typical incinerators. Perlite, with sulfuric acid surface modification, was also used in the PBS System during tests conducted at Tooele Army Depot (AD).

A select embodiment of the present invention, the IMECS™, was installed and tested on a mobile APE 1408 Brass Certification Unit at Tooele AD. It treated a 500 cubic feet per minute (cfm) exhaust stream containing metal particulates and vapors. The IMECS™ captured approximately 97% of the lead and 99.5% of the copper in the stack emissions. The concentration of cadmium in the emissions was a maximum of about 4.4 $\mu g/m^3$. About 90% of the lead was removed by stainless steel filters with the remaining amount of captured lead sorbed by a modified perlite sorbent. The tests further demonstrated that the PBS System should be heated above about 150° C. (about 300° F.) before feed stock, such as spent brass cases from small arms ammunition, is introduced to a furnace.

Stainless steel filters can be operated at temperatures up to 1000° C. The sorbent used in select embodiments of the present invention performs best at temperatures at or above 150° C. In select embodiments of the present invention, pressure drop across the filters is minimal because they are cleaned continuously with "on-line" intermittent methods, e.g., sonication. In select embodiments of the present invention, the filters may be cleaned "off-line" in an aqueous cleaning bath if required.

In select embodiments of the present invention, the dry sorbent bed for capturing metal vapors uses modified perlite, an aluminosilicate derived from volcanic sands, readily available and very inexpensive. The stability and surface characteristics of perlite make it extremely well suited for high temperature applications. The sorption capacity for lead vapors, particularly for sulfuric acid surface-treated perlite as employed in select embodiments of the present invention, is very high in comparison to conventional inexpensive sorbents used at similar temperatures. In select embodiments of the present invention, the metal-loaded sorbent may be regenerated easily and the metals recovered, vitrified, or encapsulated for disposal.

The IMECS™, as employed in select embodiments of the present invention, is compact and may be easily scaled. Select embodiments of the present invention may be used as a stand-alone system or components may be used separately as a pre-treatment or post-treatment system in conjunction with existing emission control systems.

Select embodiments of the present invention, such as the IMECS™, have applications for treating particulates (to include PM 2.5) and vapor phase emissions from fossil fuel burning and for treating emissions containing heavy metals such as lead and mercury. Stainless steel filters such as may be used with an embodiment of the present invention may be used as a pretreatment system in high-temperature applications. In select embodiments of the present invention, stainless steel filters in various configurations may replace bag-houses and facilitate high-temperature filtration. In select embodiments of the present invention, the sorbent employed may be injected into the stack emissions and collected downstream in bag-houses or any of various particulate filter collection systems.

Select embodiments of the present invention, such as the IMECS™, are uniquely scalable to small combustion sources, making them ideally suited as portable units. Unlike electrostatic precipitators, IMECS™ may be used for both charged (ionic) and non-charged particulates. Further, select embodiments of the present invention do not use high voltage sources, thus requiring less energy and reducing capital costs. Additionally, in select embodiments of the present invention, the individual components (i.e., stainless steel filters or the dry sorbent) may be used separately. In select embodiments of the present invention, perlite is used as a sorbent for metal vapors, specifically those existing at high temperatures. Preferably, perlite employed in select embodiments of the present invention is surface-modified perlite of any type such as chemically modified, mechanically modified, or a combination of the two. In select embodiments of the present invention, perlite, including surface-modified variants, may be injected into the exhaust stream or enclosed in a fixed bed, either method employing perlite as a sorbent for metal vapors, preferably at temperatures above about 150° C. (about 300° F.).

EXAMPLE

The APE 1408 Brass Certification Unit, as may be represented as a furnace 101 in FIG. 1, heats spent ammunition normally comprising a brass casing, in some cases a spent steel primer, residual primer compound and residual "smokeless" propellant ("gun powder") at temperatures to about 1000-1200° F. (about 490-650° C.) for a pre-specified duration. During this heating, any of the "residuals" and any "duds" (unfired cartridges possibly with a full complement of propellant and the copper-clad lead-core bullet) are safely burnt or diffused. This "cooking" of the spent ammunition ensures safe handling for further metal recovery (i.e., mainly the brass component of the casings). However, during the cooking, small amounts of residual regulated metals, such as lead and cadmium, may be released into the atmosphere. These regulated metals may be released in the form of either particulates or vapors, or both.

Select embodiments of the present invention provide both a process and equipment for control of airborne metal emissions. Microporous steel screen filters located in metal housings 102A, 102B capture particulates (solids) of metal while metal vapors are adsorbed by filter beds, as contained in housing 103, preferably employing surface modified perlite sorbents.

Refer to FIG. 1, a schematic of a select embodiment of the present invention, as may be represented by an emissions control system 100 termed IMECS™. The particulate filtering system 102, termed the SSP Filter System, a sub-system of IMECS™ consists of two filter housings 102A, 102B to accommodate approximately 20-inch square stainless steel filters (not shown separately in FIG. 1), valves 107 for operating the individual filter housings 102A, 102B separately, as necessary, and pressure gauges 104 for monitoring pressure drop in each housing 102A, 102B for indications of the efficiency of each and to indicate the need for off-line cleaning when the pressure drop reaches a pre-specified figure. In select embodiments of the present invention, the steel filter housings 102A, 102B are equipped with sonic horns (not shown separately) that are operated periodically or intermittently at a pre-specified sonic frequency for cleaning by sonication.

In select embodiments of the present invention, the filter housings 102A, 102B are operated alternately, permitting one to be cleaned off-line as necessary, e.g., a filter may be removed and cleaned in an aqueous cleaner bath and replaced without interruption of the filtering of the exhaust from the furnace 101.

Figure 5:
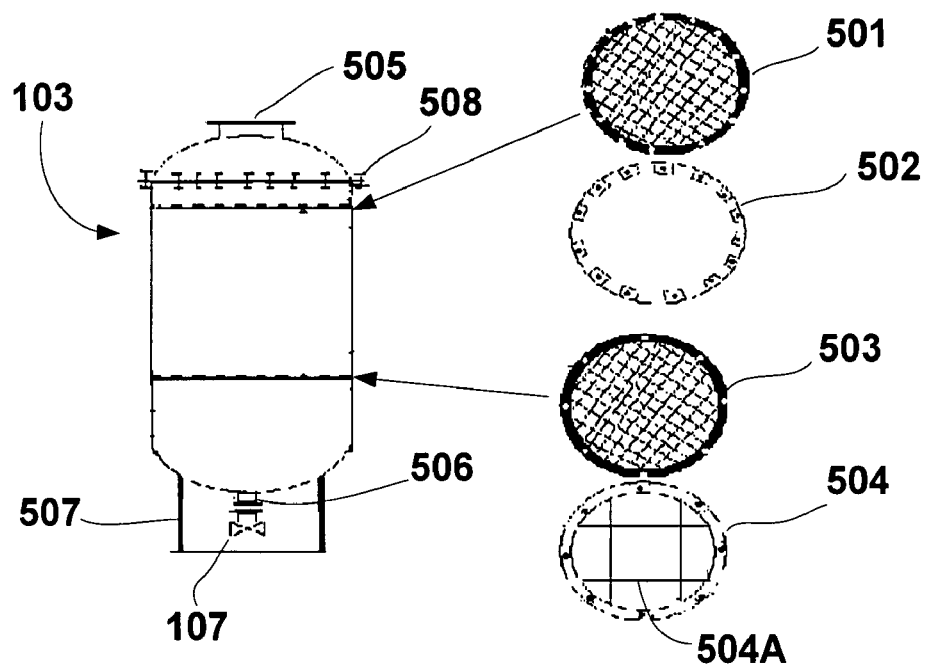
FIG. 5 is a schematic of a sorbent bed system that may be used in select embodiments of the present invention.

Refer to FIGS. 1 and 5. FIG. 5 is a schematic of a sorbent bed system 103 as may be used in select embodiments of the present invention, e.g., as the PBS System of the IMECS™. In select embodiments of the present invention, the emissions from the particulate filtering system 102 pass through a sorbent bed system 103 prior to being exhausted through a flanged opening 505 via a fan 108 through a stack 109. In select embodiments of the present invention, the pressure drop across the sorbent bed system 103 is monitored by a pressure gauge 104, and the temperature of the exhaust stream is also monitored via a temperature gauge 105 to insure optimum conditions for sorbing of metal vapors onto the sorbent. Further, in select embodiments of the present invention a sample port 106 is provided at the output of the sorbent bed system 103 to monitor performance of the system. In select embodiments of the present invention, a butterfly valve 107 is provided to serve as a drain for accumulated solids in the sorbent bed(s) supported on screens 501, 503 and the individual beds may be accessed via a flanged lid 508 at the top of the sorbent bed system 103. In select embodiments of the present invention, the sorbent system is designed to withstand internal pressure of about 100 psi at about 800° F. (about 425° C.).

In select embodiments of the present invention, one sorbent supporting screen 501 is attached at the top of the sorbent bed system 103 via a top screen support 502, nominally 100 mesh stainless steel, bolted to support brackets (not shown separately) welded into the inside diameter of the sorbent bed system 103 and one sorbent supporting screen 503, nominal 100 mesh stainless steel, is supported by its support 504 that includes support brackets 504A for holding sorbent at the bottom of the sorbent bed system 103. Other embodiments of the present invention may use a single sorbent support screen 501 or even more than two sorbent support screens 501, depending on user requirements. Further, a second sorbent bed system 103 (not shown separately) may be added in parallel if required for long term continuous operation so that one of the sorbent bed systems 103 may be taken off-line for re-generation or cleaning. The saturated sorbent bed system 103 also may be recharged with fresh sorbent during off-line refurbishing.

Figure 6:
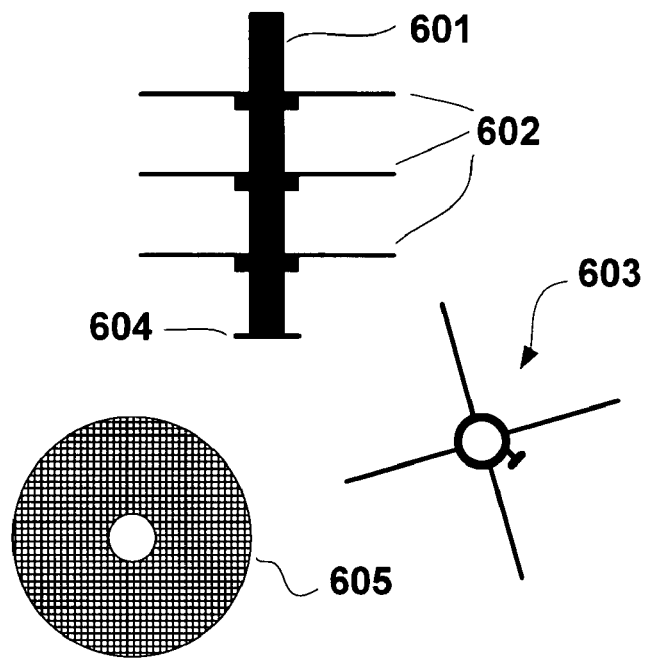
FIG. 6 is a schematic of a support system for supporting multiple sorbent beds in a cylindrical sorbent bed system that may be used in select embodiments of the present invention.

Refer to FIG. 6, a schematic of a support system for containing multiple sorbent beds in a cylindrical support bed system 103. During testing at Tooele Army Depot (AD), the sorbent (modified perlite as described for a select embodiment of the '794 patent) of a 60-mesh size was distributed among five beds, using a total of five 100 mesh stainless steel screens (top, bottom and three equally spaced between the top and bottom screens). The central screens 605 were placed on the supporting arms 602 which were bolted on to a central supporting tube 601 using the individual screen support configuration 603, comprising rods 602 affixed to a collar with a set screw or bolt through it for affixing to the supporting tube 601. An end cap 604 is affixed to this supporting tube 601. In select embodiments of the present invention, the central screens 605 may be reduced to two or one. The purpose of additional screen supports 603 for additional beds is to distribute the sorbent through the height of the sorbent bed system to prevent or reduce channeling in individual beds.

TESTS

Pressure drop and particle penetration characterization of stainless steel filters and sorbent beds has been done in the laboratory. (Boddu et al. 2005). Further, metal sorption (solids and vapors combined) at various locations within a "fielded" emissions control system was determined by comparing measurements of lead, cadmium and other metals concentrations at each of these locations for six different test scenarios. Concentrations were measured using X-Ray Florescence (XRF). Concentrations of lead (Pb), Cadmium (Cd), Copper (Cu), Zinc (Zn), and Antimony (Sb) were monitored. Air flow rates, pressure drop, and temperatures were taken at the stainless steel screens, sorbent bed and from the emissions stack of the fielded emissions control system.

In all of the six test scenarios, the feed to the furnace 101 was depleted brass casings (not shown separately) as described above. Although FIG. 1 is not an exact schematic of the fielded emissions control system, major items and their relative positions may be properly located thereon, so references to FIG. 1 may be applied in the following discussion of testing.

For this testing and sample collection the process consisted of: Starting the APE 408, waiting until it reached operating temperature of about 700° F. (370° C.), loading brass casings (and additional lead, as appropriate). Upon loading the APE 408, sample collection began. Samples were collected for about 20 minutes per sampling event. During the collection the flow rate of the emissions and pressure drops throughout the system were monitored. Untreated samples were collected by splitting the exhaust stream and passing it through a composite filter designed by Cooper Environmental Services, Portland, Oreg. The composite filter collects particulate matter and also vapor phase metals. The total flow of the air was measured through these sampling filters and from this an estimate was made of the concentration of each metal in the exhaust stream. Once a sample is collected, the sonication horn is activated for a few seconds (nominally 10 sec) and after the sonication event the next sample collection began. A typical test ran about 1-1.5 hours, including heating the furnace, sonication events, and sample collection.

Figure 7:
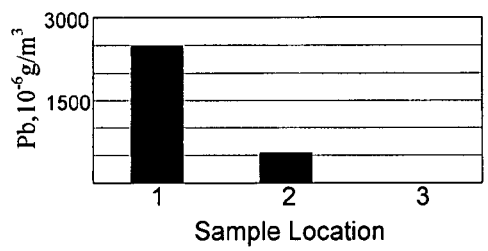
FIG. 7 provides test results of a select embodiment of the present invention for five targeted metals under first test conditions for actual loading and operation of a U.S. Army brass certification unit.
Figure 7:
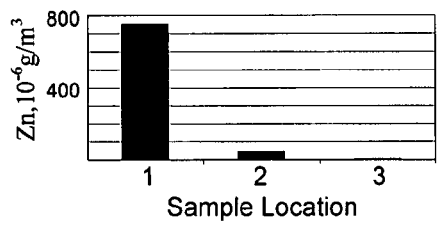
Figure 7:
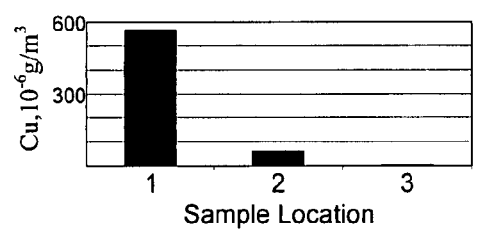
Figure 7:
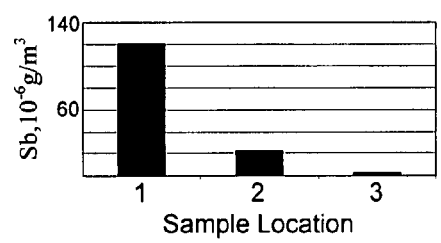
Figure 7:
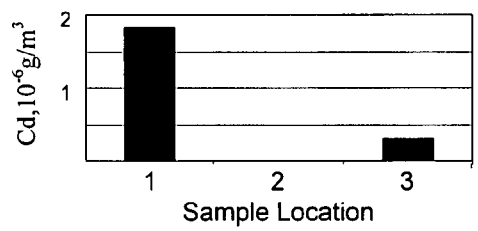

In the first of the six test scenarios, the brass casings were fed into a 950° F. (510° C.) furnace 101 at 200 lb/hr and no lead was added. The flow rate at the stack 109 was 500 actual cubic feet per minute (acfm) and the stainless steel filters (not shown separately, but embedded in the SSP Filter System 102 of FIG. 1) had a pore size of 2 µm, the smallest size used in any of these six test scenarios. Results of this field study for each of five targeted metals are shown in FIG. 7 where Location 1 is at the exhaust of the furnace 101; Location 2 is after the stainless steel filter system 102 but before the sorbent bed system 103 and Location 3 is at the stack 109. As can be seen, a considerable portion of each metal is removed at the stainless steel filter system 102, and virtually all of each metal is removed after the exhaust flows through the sorbent bed system 103 to the stack 109. Note that negligible amounts of Cd were present at the start of treatment (Location 1).

A second test scenario changed the feed rate and the furnace temperature and added lead. The feed to the furnace 101 was depleted brass casings as described above. [Note that the brass casings may not have been of the same type for each of the firings in the six tests and there was no effort to insure homogeneity of feed stock for all six tests, e.g., mixing enough brass casings together to supply all six tests and randomly selecting brass casings for each test from the bulk mixture. The feed rate for different tests was planned to be different as well as the lead content. The intention was to test different rates of loadings, however, the temperatures were also varied slightly as may be experienced in real world operation of similar systems.]

Figure 8:
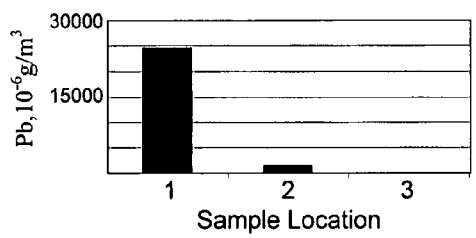
FIG. 8 provides test results of a select embodiment of the present invention for five targeted metals under second test conditions for actual loading and operation of a U.S. Army brass certification unit.
Figure 8:
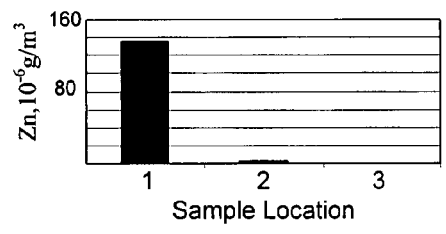
Figure 8:
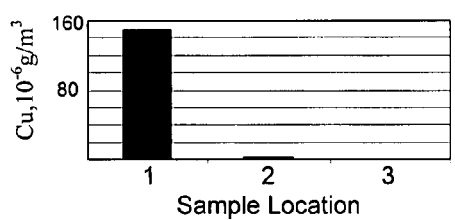
Figure 8:
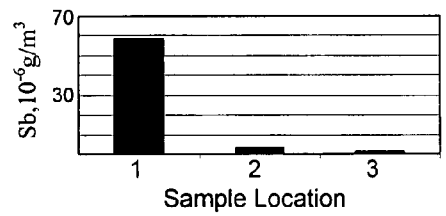
Figure 8:
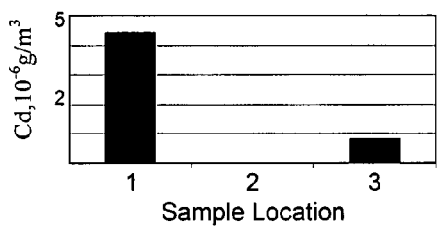

The casings were fed into a 1192° F. (about 650° C.) furnace 101 at 156 lb/hr and lead was added at 1.5 lbs/hr. The stack flow rate was 500 acfm and the stainless steel filters had a pore size of 2 µm. Results of this field study for each of the targeted metals are shown in FIG. 8 where: Location 1 is at the exhaust of the furnace 101; Location 2 is after the stainless steel filter system 102 but before the sorbent bed system 103, and Location 3 is at the stack 109. As can be seen, even with added lead a significantly higher percent of metal was removed at the stainless steel filter system 102 than in the first test when lower furnace temperatures were employed, and nearly all of each metal is removed after the exhaust flows through the sorbent bed system 103. Thus, select embodiments of the present invention are particularly effective at high exhaust gas temperatures. Note again that negligible amounts of Cd were present at the start of treatment (Location 1).

Figure 9:
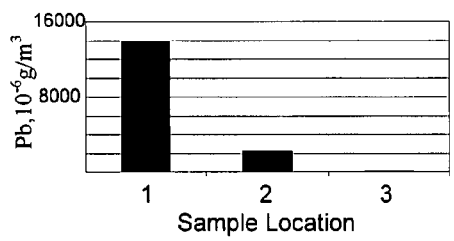
FIG. 9 provides test results of a select embodiment of the present invention for five targetted metals under third test conditions for actual loading and operation of a U.S. Army brass certification unit, APE 1408.
Figure 9:
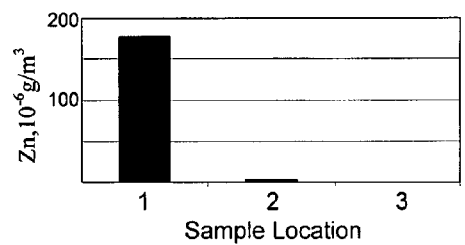
Figure 9:
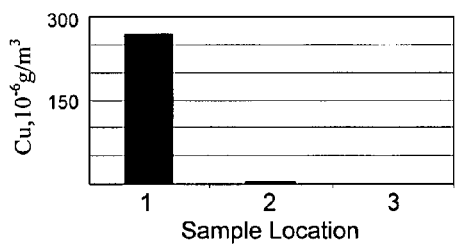
Figure 9:
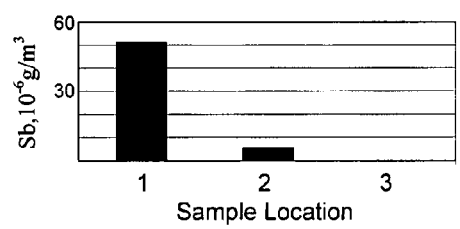
Figure 9:
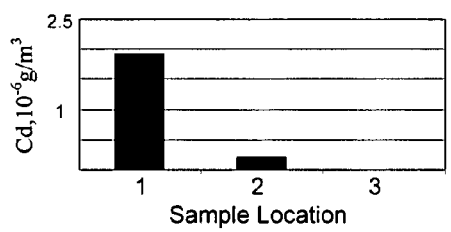

A third test kept the feed rates of the second test, reduced the furnace temperature somewhat and added even more lead while more than doubling the pore size of the stainless steel filters. The feed to the furnace 101 was depleted brass casings as described above. The casings were fed into a 1094° F. (590° C.) furnace 101 at 156 lb/hr and lead was added at 2.25 lbs/hr. The stack flow rate was 500 acfm and the stainless steel filters had a pore size of 5 µm. Results of this field study for each of the targeted metals are shown in FIG. 9 where: Location 1 is at the exhaust of the furnace 101, Location 2 is after the stainless steel filter system 102 but before the sorbent bed system 103, and Location 3 is at the stack 109. As can be seen, even with more added lead and reduced furnace exhaust temperature a high percent of metal was removed at the stainless steel filter system 102, and virtually, all of each metal is removed after the exhaust flows through the sorbent bed system 103. Thus, select embodiments of the present invention are particularly effective at relatively high exhaust gas temperatures even with increased lead loads. Note again that negligible amounts of Cd were present at the start of treatment (Location 1).

Figure 10:
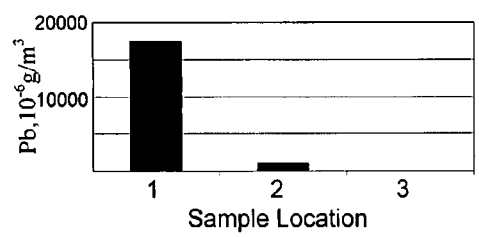
FIG. 10 provides test results of a select embodiment of the present invention for five targeted metals under fourth test conditions for actual loading and operation of a U.S. Army brass certification unit, APE 1408.
Figure 10:
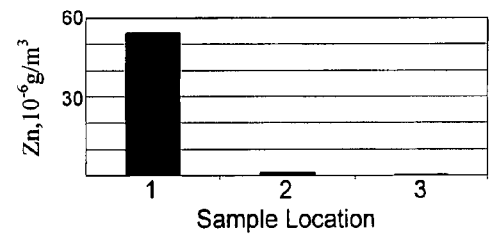
Figure 10:
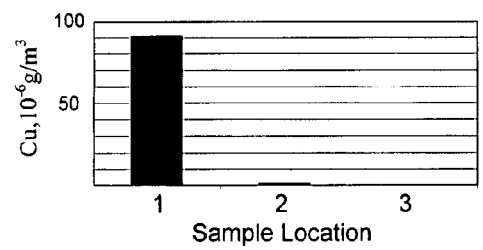
Figure 10:
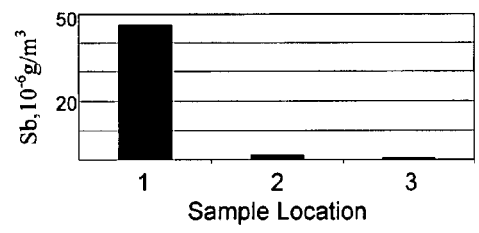
Figure 10:
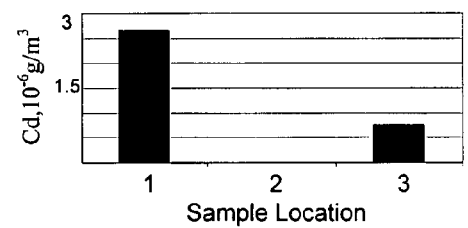

A fourth test kept the feed rates of the second test; reduced the added lead and increased the furnace temperature to approximately that of the second test, and kept the pore size of the third test while increasing the emissions flow rate. The feed to the furnace 101 was depleted brass casings as described above. The casings were fed into a 1199° F. (about 650° C.) furnace 101 at 156 lb/hr, and lead was added at 1.5 lbs/hr. The stack flow rate was 625 acfm and the stainless steel filters had a pore size of 5 µm. Results of this field study for each of the targeted metals are shown in FIG. 10 where: Location 1 is at the exhaust of the furnace 101; Location 2 is after the stainless steel filter system 102 but before the sorbent bed system 103, and Location 3 is at the stack 109. As can be seen, even with increased stack flow rate, high furnace exhaust temperature and the increased pore size, a high percent of metal was removed at the stainless steel filter system 102, and nearly all of each metal is removed after the exhaust flows through the sorbent bed system 103. Thus, select embodiments of the present invention are particularly effective at high exhaust gas temperatures even with increased stack flow rates. Note again that negligible amounts of Cd were present at the start of treatment (Location 1).

Figure 11:
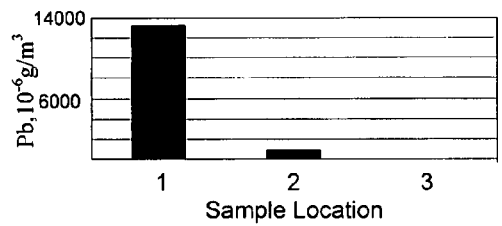
FIG. 11 provides test results of a select embodiment of the present invention for five targeted metals under fifth test conditions for actual loading and operation of a U.S. Army brass certification unit.
Figure 11:
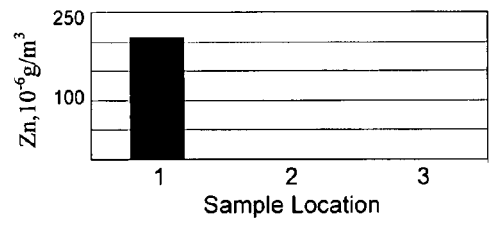
Figure 11:
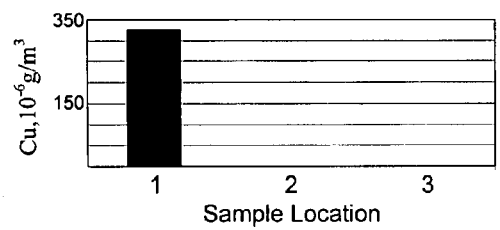
Figure 11:
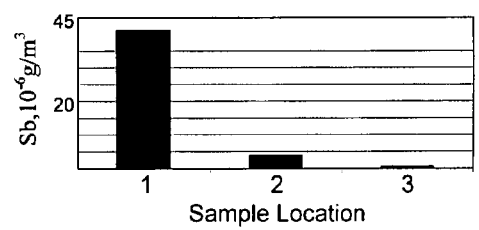
Figure 11:
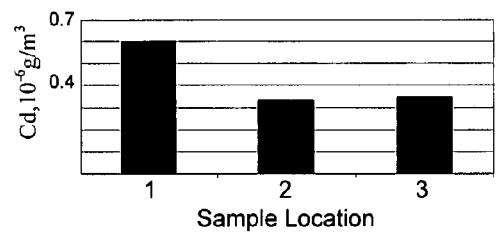

A fifth test kept the feed rates of the second test; increased the added lead and decreased the furnace temperature to just above that of the first test, and kept the pore size of the third test and the emissions flow rate of the fourth test. The feed to the furnace 101 was depleted brass casings as described above. The casings were fed into a 1017° F. (about 545° C.) furnace 101 at 156 lb/hr and lead was added at 3 lbs/hr. The stack flow rate was 625 acfm and the stainless steel filters had a pore size of 5 µm. Results of this field study for each of the targeted metals are shown in FIG. 11 where: Location 1 is at the exhaust of the furnace 101; Location 2 is after the stainless steel filter system 102 but before the sorbent bed system 103, and Location 3 is at the stack 109. As can be seen, even with increased stack flow rate, high furnace exhaust temperature and the increased pore size, a high percent of metal was removed at the stainless steel filter system 102, and nearly all of each metal is removed after the exhaust flows through the sorbent bed system 103. Thus, select embodiments of the present invention are particularly effective at even relatively high exhaust gas temperatures even with increased lead feed and increased stack flow rates. Note again that almost immeasurable amounts of Cd were present at the start of treatment (Location 1).

Figure 12:
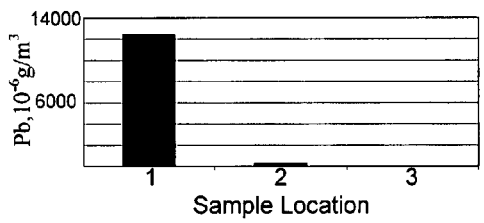
FIG. 12 provides test results of a select embodiment of the present invention for five targeted metals under sixth test conditions for actual loading and operation of a U.S. Army brass certification unit.
Figure 12:
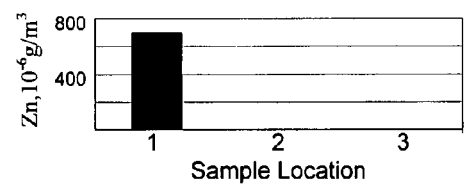
Figure 12:
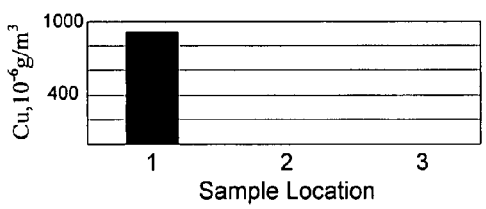
Figure 12:
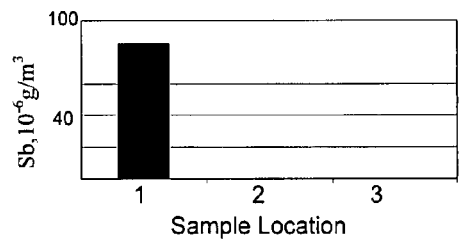
Figure 12:
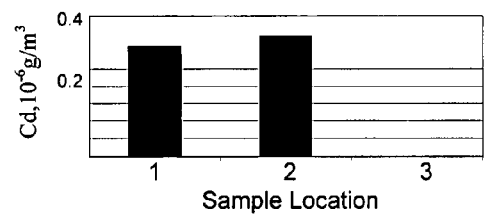

A sixth test kept the feed rates of the second test and the increased added lead of the fifth test; increased the furnace temperature to just above that of the third test, and kept the pore size of the third test, while the emissions flow rate was increased to the highest of all tests. The feed to the furnace 101 was depleted brass casings as described above. The casings were fed into a 1130° F. (610° C.) furnace 101 at 156 lb/hr and lead was added at 3 lbs/hr. The stack flow rate was 708 acfm and the stainless steel filters had a pore size of 5 µm. Results of this field study for each of the targeted metals are shown in FIG. 12 where: Location 1 is at the exhaust of the furnace 101; Location 2 is after the stainless steel filter system 102 but before the sorbent bed system 103, and Location 3 is at the stack 109. As can be seen, even with increased stack flow rate, high furnace exhaust temperature and the increased pore size, a very high percent of metal was removed at the stainless steel filter system 102, and nearly all of each metal is removed after the exhaust flows through the sorbent bed system 103. Thus, select embodiments of the present invention are particularly effective at high exhaust gas temperatures even with increased lead feed and increased stack flow rates. Note again that almost immeasurable amounts of Cd were present at the start of treatment (Location 1).

The abstract of the disclosure is provided to comply with the rules requiring an abstract that will allow a searcher to quickly ascertain the subject matter of the technical disclosure of any patent issued from this disclosure. (37 CFR § 1.72(b)). Any advantages and benefits described may not apply to all embodiments of the invention.

While the invention has been described in terms of some of its embodiments, those skilled in the art will recognize that the invention can be practiced with modifications within the spirit and scope of the appended claims. For example, although the system is described in specific examples for collecting airborne metal emissions, it may be used for any type of fluid emissions and thus may be useful in such diverse applications as manufacturing, mining, smelting, refining, re-cycling, remediating, power production, and the like. Emissions of interest may be from stacks at manufacturing plants or power production facilities, smelters, refineries, portable incinerators, portable generators, portable treatment furnaces, and the like. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Thus, it is intended that all matter contained in the foregoing description or shown in the accompanying drawings shall be interpreted as illustrative rather than limiting, and the invention should be defined only in accordance with the following claims and their equivalents.

We claim:

1. A system for removing at least one metal in both particulate and vapor form from fluid emissions, said emissions emitted from a source at temperatures above about 150° C. comprising:
   at least one first device comprising at least one metal screen of pore size in the range of about one micron to about 20 microns to capture and retain solid metal in said fluid emissions, said first device in operable communication with said source;
   at least one second device holding at least perlite particles, said second device capturing and retaining said metal in vapor form, said second device downstream with respect to said source from, and in operable communication with, said first device; and
   at least one fan in operable communication with said second device, said fan to facilitate movement of said fluid emissions through said system.

2. The system of claim 1 further comprising at least one stack in operable communication with said fan, said at least one stack to exhaust said fluid emissions from said system.

3. The system of claim 2 further comprising means for connecting said source to said at least one first device, said at least one first device to said at least one second device, said at least one second device to at least one fan, and said at least one fan to at least one stack.

4. The system of claim 3 in which said connection means comprises at least conduits that withstand temperatures up to about 1300° F. (705° C.).

5. The system of claim 1 further comprising pressure gauges for at least monitoring pressure drop across at least each of said at least one first and at least one second devices.

6. The system of claim 1 further comprising temperature gauges to monitor temperatures at least at the output of said source, each said first at least one device and each said second at least one device.

7. The system of claim 1 further comprising first ports for monitoring content of said fluid emissions at least at each of said at least one first device and said at least one second device.

8. The system of claim 1 further comprising second ports incorporated in each of said first at least one device and said second at least one device,
   wherein said second ports facilitate removal of excess solids.

9. The system of claim 1 further comprising:
   at least one first valve permitting switching between multiple said at least one first devices,
   wherein said at least one first device comprises at least two said first devices operating in parallel, and
   wherein use of one said first valve permits at least one said first device to be removed from operation for inspection and cleaning while said system is operating; and
   at least one cleaning system in operable communication with said at least one first device, said at least one cleaning system selected from the group consisting of pulse-jets, sonication devices, back flush devices, and combinations thereof.

10. The system of claim 1 further comprising:
    at least one second valve permitting switching between multiple said second devices,
    wherein said at least one second device comprises at least two said second devices operating in parallel, and
    wherein use of said second valve permits at least one said second device to be removed from operation for inspection and cleaning while said system is operating.

11. The system of claim 1 in which each said at least one first device comprises said at least one metal screen of pore size in the range of about one micron to about 20 microns contained within an enclosed first structure having an inlet and at least one outlet,
    wherein said enclosed first structure is built to withstand a pre-specified pressure and temperature.

12. The system of claim 11 in which said enclosed first structure comprises at least in part stainless steel and said metal screen of pore size in the range of about one micron to about 20 microns comprises at least some stainless steel, for filtering solids from fluid emissions having a temperature at or above about 650° F. (430° C).

13. The system of claim 11 in which said enclosed first structure incorporates a port for installation and removal of said at least one metal screen of pore size in the range of about one micron to about 20 microns and comprises at least in part stainless steel,
    wherein said metal screen comprises at least some stainless steel, and
    wherein said metal screen preferably has a pore size in the range between about one and about ten microns for filtering solids from fluid emissions having a temperature in the range of about 900° F. (490° C.) to about 1300° F. (705° C.), and
    wherein said pre-specified pressure is at least about 100 psi and said pre-specified temperature is at least about 1300° F. (705° C.).

14. The system of claim 1 in which each said at least one second device comprises at least some said perlite positioned on at least one support contained within an enclosed second structure having an inlet and at least one outlet,
    wherein said enclosed second structure is built to withstand flows of a pre-specified pressure and a pre-specified temperature.

15. The system of claim 14 in which said perlite comprises at least in part surface-modified perlite.

16. The system of claim 15 in which said surface-modified perlite is acid treated.

17. The system of claim 14 in which said enclosed second structure incorporates a port for installation and removal of said at least one support and said perlite and comprises at least in part stainless steel and in which said at least one support comprises at least in part at least one screen of mesh in the range of about 20 to about 100, said second device filtering metal vapors from fluid emissions having a temperature in the range of about 900° F. (490° C.) to about 1300° F. (705° C.), and
    wherein said pre-specified pressure is at least about 100 psi and said pre-specified temperature is at least about 1300° F. (705° C.).

18. The system of claim 17 in which said at least one screen of mesh in the range of about 20 to about 100 is of a mesh of about 60.

19. A method for removing at least one metal in both particulate and vapor form from fluid emissions, said emissions emitted from a source at temperatures above about 150° C., comprising:
    providing at least one first device comprising at least one metal screen of pore size in the range of about one micron to about 20 microns incorporated in a system, said at least one first device for capturing and retaining solid metal in said fluid emissions, said at least one first device operably communicating with said source;
    providing at least one second device incorporated in said system and holding at least perlite particles, said at least one second device for capturing and retaining metal in vapor form, said at least one second device downstream with respect to said source from, and operably communicating with, said at least one first device; and providing at least one fan incorporated in said system, said at least one fan operably communicating with said at least one second device, said fan facilitating movement of said fluid emissions through said system.

20. The method of claim 19 further comprising: providing at least one stack incorporated in said system and operably communicating with said at least one fan, said at least one stack exhausting said fluid emissions from said system.

21. The method of claim 20 further providing means for connecting said source to said at least one first device, said at least one first device to said at least one second device, said at least one second device to said at least one fan and said at least one fan to said at least one stack.

22. A method for treating metal-containing fluid emissions from a source, comprising:

capturing and retaining solid metal in said fluid emissions in at least one first device incorporated in a system, said at least one first device operably communicating with said source;

capturing and retaining metal in vapor form in at least one second device incorporated in said system downstream from said at least one first device with respect to said source, said at least one second device operably communicating with said at least one first device; and facilitating movement of said fluid emissions from said source through said system via at least one fan operably communicating with said at least one second device.

23. A system for removing at least one metal in both particulate and vapor form from fluid emissions, said emissions emitted from a source at temperatures above about 150° C. comprising:

at least one means incorporating a filter having a pore size in the range of about one micron to about 20 microns for capturing and retaining said at least one metal in said particulate form, said at least one means for capturing and retaining said metal in particulate form in operable communication with said source;

at least one means holding at least perlite particles for capturing and retaining said at least one metal in vapor form, said means for capturing and retaining metal in vapor form downstream with respect to said source from, and in operable communication with, said means incorporating a filter having a pore size in the range of about one micron to about 20 microns for capturing and retaining said at least one metal in said particulate form; and at least one means for facilitating movement of said fluid emissions through said system in operable communication with at least said means configured to hold at least perlite particles for capturing and retaining said at least one metal in vapor form.

24. The system of claim 23 further comprising at least one means for exhausting said fluid emissions from said system, said means for exhausting said fluid emissions in operable communication with said means for facilitating movement of said fluid emissions.

* * * * *